United States Patent
Li

(10) Patent No.: US 10,117,194 B2
(45) Date of Patent: Oct. 30, 2018

(54) METHOD AND APPARATUS FOR POWER HEADROOM REPORTING IN A WIRELESS COMMUNICATION SYSTEM

(71) Applicant: INNOVATIVE SONIC CORPORATION, Taipei (TW)

(72) Inventor: Ming-Che Li, Taipei (TW)

(73) Assignee: INNOVATIVE SONIC CORPORATION, Taipei (TW)

(*) Notice: Subject to any disclaimer, the term of this patent is extended or adjusted under 35 U.S.C. 154(b) by 203 days.

(21) Appl. No.: 14/510,557

(22) Filed: Oct. 9, 2014

(65) Prior Publication Data

US 2015/0098424 A1 Apr. 9, 2015

Related U.S. Application Data

(60) Provisional application No. 61/888,675, filed on Oct. 9, 2013.

(51) Int. Cl.
H04W 52/04 (2009.01)
H04W 52/36 (2009.01)
H04W 72/04 (2009.01)

(52) U.S. Cl.
CPC ......... *H04W 52/365* (2013.01); *H04W 72/04* (2013.01)

(58) Field of Classification Search
CPC .............. H04W 52/365; H04W 72/04
See application file for complete search history.

(56) References Cited

U.S. PATENT DOCUMENTS

| | | | |
|---|---|---|---|
| 2012/0040708 A1 | 2/2012 | Jeong et al. | |
| 2013/0089050 A1* | 4/2013 | Heo | H04W 52/365 370/329 |
| 2014/0126440 A1* | 5/2014 | Frank | H04W 52/06 370/311 |
| 2015/0085760 A1* | 3/2015 | Yamada | H04W 24/10 370/329 |

OTHER PUBLICATIONS

3GPP TSG-RAN2 Meeting #74, Barcelona, Spain, May 9-13, 2011 (R2-113557).
3GPP TSG-RAN WG4 Meeting #55, Montreal, May 10-14, 2010 (R4-102314).
Search Report on corresponding EP Patent Application No. 14188261.3 dated Feb. 5, 2015.

* cited by examiner

*Primary Examiner* — Rhonda Murphy
(74) *Attorney, Agent, or Firm* — Blue Capital Law Firm, P.C.

(57) ABSTRACT

A method and apparatus are disclosed for power headroom reporting in a wireless communication system. The method includes a UE (User Equipment) being configured with at least a first cell and a second cell. The method also includes the UE reports a PHR (Power Headroom Report) on the first cell in a subframe, wherein the PHR contains the power headroom value of the second cell, and the power headroom value of the second cell is derived using a specific PUSCH resource assignment regardless of whether there is PUSCH (Physical Uplink Shared Channel) transmission in the second cell in the subframe or not.

30 Claims, 6 Drawing Sheets

METHOD AND APPARATUS FOR POWER HEADROOM REPORTING IN A WIRELESS COMMUNICATION SYSTEM

CROSS-REFERENCE TO RELATED APPLICATIONS

The present application claims the benefit of U.S. Provisional Patent Application Ser. No. 61/888,675 filed on Oct. 9, 2013, the entire disclosure of which is incorporated herein by reference.

FIELD

This disclosure generally relates to wireless communication networks, and more particularly, to a method and apparatus for power headroom reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for power headroom reporting in a wireless communication system. The method includes a UE (User Equipment) being configured with at least a first cell and a second cell. The method also includes the UE reports a PHR (Power Headroom Report) on the first cell in a subframe, wherein the PHR contains the power headroom value of the second cell, and the power headroom value of the second cell is derived using a specific PUSCH resource assignment regardless of whether there is PUSCH (Physical Uplink Shared Channel) transmission in the second cell in the subframe or not.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including the Chairman's Notes for RAN1#74 and Document Nos. R1-133396, "Physical Layer Aspects of Dual Connectivity", InterDigital Communications, R1-133182, "Physical layers aspects of dual connectivity", ETRI, R1-133436, "Physical layer aspects of dual connectivity", Ericsson, ST-Ericsson, and TS 36.213 V11.4.0 "E-UTRA Physical layer procedures (Release 11)". The standards and documents listed above are hereby expressly incorporated by reference in their entirety.

Figure 1:
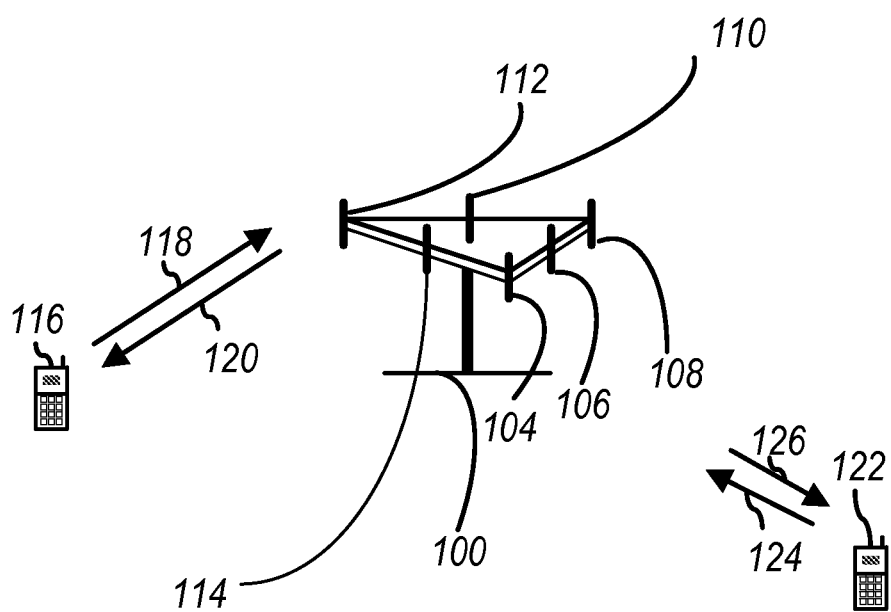
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
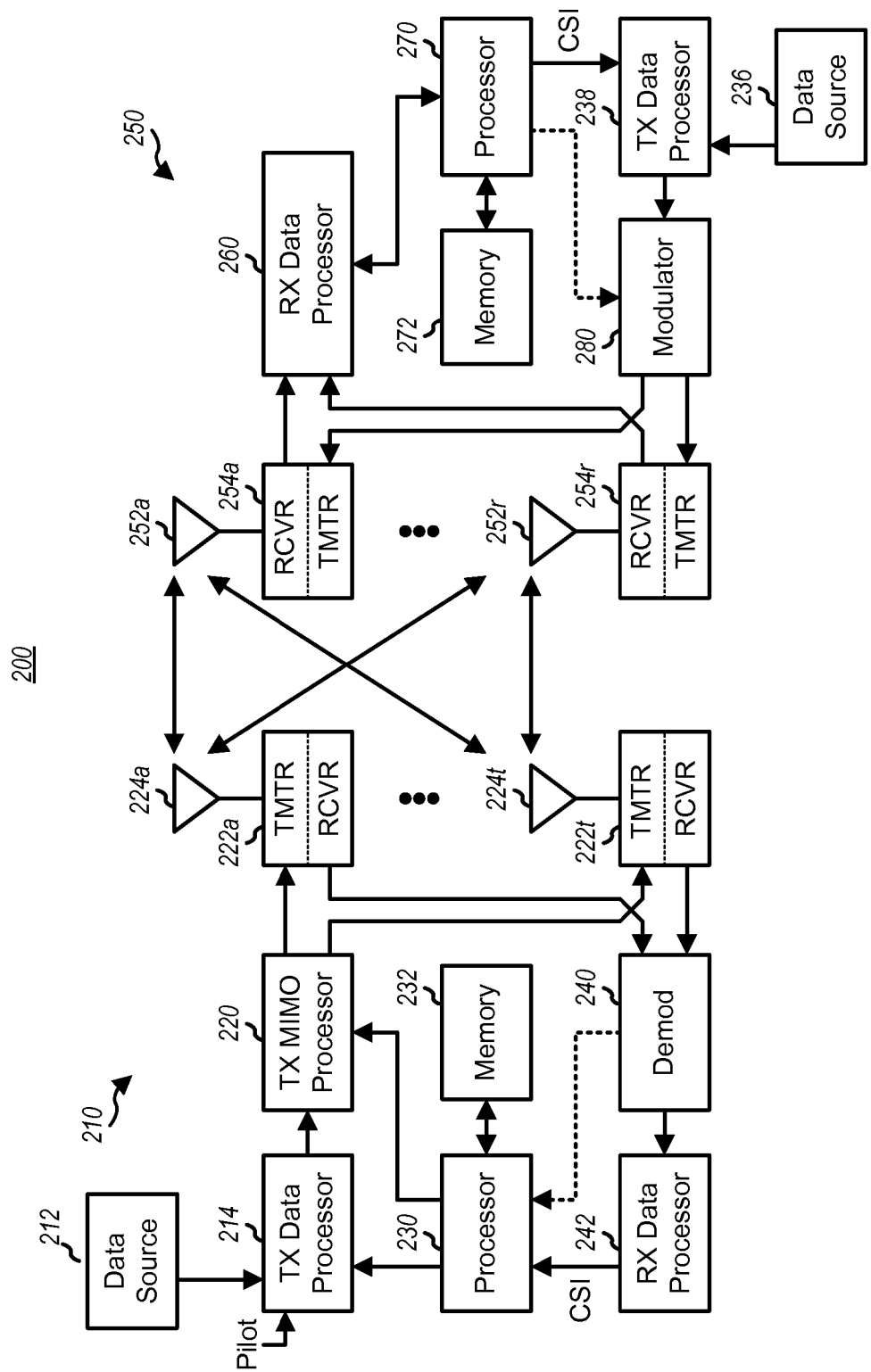
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
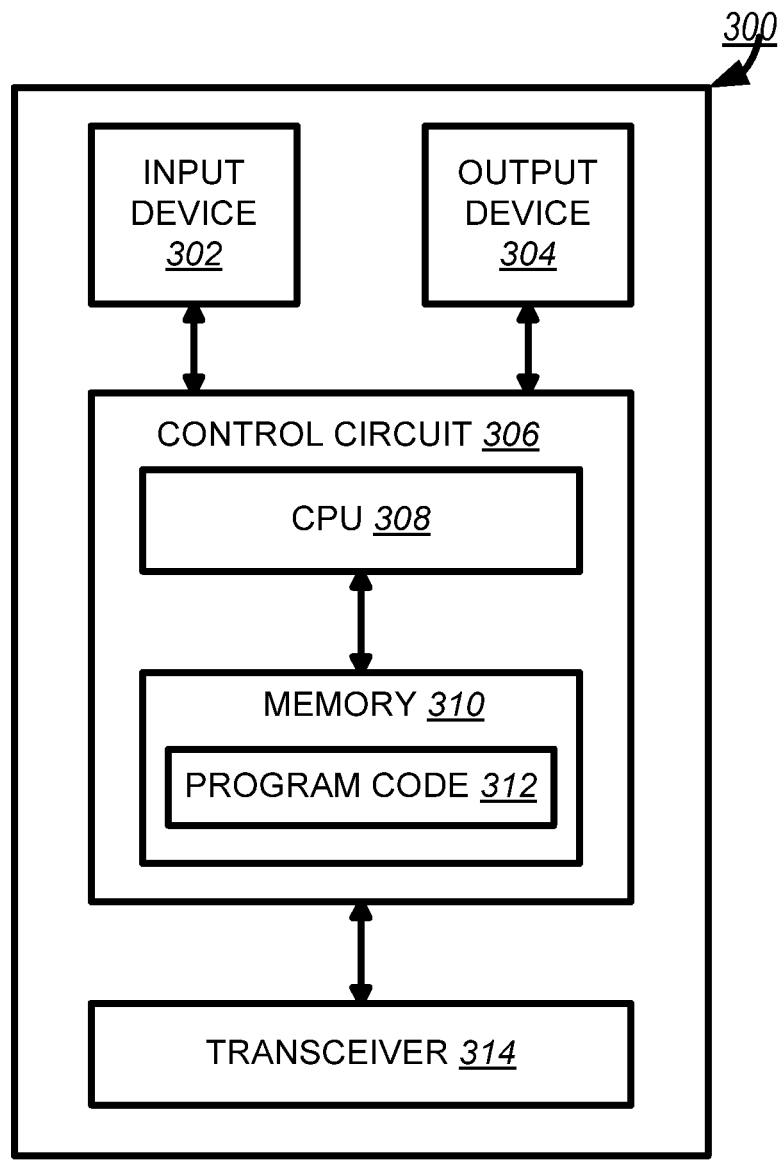
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
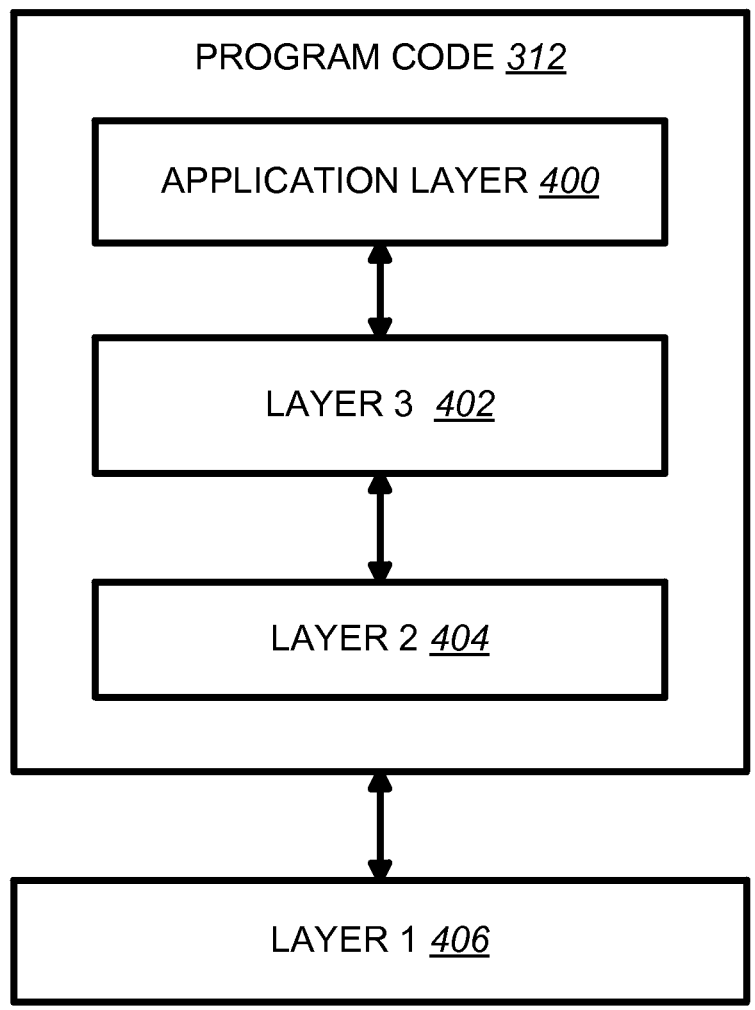
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In RAN1#74 meeting, there is the possible conclusion about the L1 impact of higher-layer aspects of small cell enhancement, as described in the Chairman's Notes for Chairman's Notes for RAN1#74 as follows:
Possible Conclusions:
  Depending on the detailed architecture, dual connectivity may have impacts on the following aspects of L1 operation. Details of these impacts would need further study and would depend on factors such as:
    whether the UE has the capability for simultaneous transmission
    the level of synchronisation and coordination between eNBs
  Possible areas of L1 impact include:
    DL HARQ operation and feedback
    UL power control operation, scaling and PHR
    UL transmit timing control
    Interactions between different UL channels
    RACH procedure CSS transmission
SR transmission
RLM Also, in RAN1#74, a contribution proposes to have additional consideration for power control including the aspect of Power Headroom Report (PHR), as described in 3GPP R1-133396 as follows:

Inter-eNB CA with simultaneous uplink transmissions can however reuse most of the UE behavior specified for LTE CA R11, with additional considerations for power control (e.g. including aspects of PHR) and how to handle specific cases of simultaneous uplink transmissions with respect to different combinations of PUCCH, PUSCH and PRACH. Some specific band combination(s) with too small separation may also require TDM operation, this would only be necessary if support for such combinations is required.

What RAN will assume as the minimal UE capabilities for inter-eNB CA will thus greatly impact what type of realization may be in scope for further study.

In addition, two contributions in 3GPP R1-133182 and R1-133436 propose that the UE could report PHR to an eNB (evolved Node B) wherein the report would include PHR of both macro and small eNBs, or of both master and secondary eNBs. In particular, 3GPP R1-133182 states:

Uplink Power Control Issues:

Although the non-ideal backhaul condition requires separate power control between the macro and small cell nodes, some degree of coordination between the nodes is necessary so that each node can estimate the power headroom for the its cell group and its dependence on the transmission for the other cell group.

For power limited UEs, uplink subframes can be grouped into following three types.

Subframes dedicated for the master eNB
Subframes dedicated for the secondary eNB
Subframes for both the master and secondary eNBs For subframes dedicated to either the master eNB or the secondary eNB, the uplink scheduling and power control can be done completely independently between the nodes. For subframes for both the master and secondary eNBs, information about the scheduling and power control of the other node can be helpful for each node, for example, the UE can provide power headroom reports about cells belonging to the other cell group to each node.

In addition, 3GPP R1-133436 states:

2.1.5 UL Power Control and PHR

A specific area that would be impacted on the physical layer of the dual connectivity is design of UL power control in case the UE transmits on multiple carriers simultaneously. The issue is here very similar to UL power control handling for UL carrier aggregation, i.e. that the UE needs to share its power on all UL carriers where it is transmitting simultaneously. The main difference between CA and dual connectivity is the backhaul delay between the network nodes. Transmitting PUCCH simultaneously on multiple UL carriers is not necessarily an issue as the total consumed power for PUCCH is relatively low and hence the UE would seldom reach it maximum transmission power. For PUSCH it is however more an issue as here the total available power may be closer to be exceeded. To ease the situation it would be useful for each corresponding eNB to know the available power headroom for the UE on all the UEs UL carriers. Hence, the eNB need a PHR report for each corresponding carrier.

Proposal

The UE reports a PHR separately to each cell and the corresponding PHR contains the PHR for all UL carriers the UE has configured As specified in Section 5.1 in 3GPP TS 36.213, Type 1 power headroom reflects the UE's power headroom for PUSCH (Physical Uplink Shared Channel). In general, the power headroom calculation considers the UE maximum available transmit power for PUSCH and the estimated PUSCH transmit power for a serving cell c in a subframe i. If there is no PUSCH in the subframe, a virtual power headroom would be calculated and reported, while assuming no PUSCH resources, zero code rate, and some specific parameters in general. More specifically, the following assumptions would be made:

Assume that $P_{CMAX,c}(i)$ is the configured UE transmit power in subframe i for serving cell c and $\hat{P}_{CMAX,c}(i)$ is the linear value of $P_{CMAX,c}(i)$.

Assume that $M_{PUSCH,c}(i)$ is the bandwidth of the PUSCH resource assignment expressed in number of resource blocks valid for subframe i and serving cell c.

Assume that $P_{O\_PUSCH,c}(j)$ is provided by higher layers for serving cell c where the value j depends on PUSCH (re)transmissions corresponding to a semi-persistent grant or a dynamic scheduled grant or random access response grant.

Assume that $PL_c$ is the downlink pathloss estimate calculated in the UE for serving cell c in dB, and the $\alpha_c(j)$ is the parameter provided by higher layers for each serving cell c.

Assume that $\Delta_{TF,c}(i)$ is the value derived by the data bits size for the uplink PUSCH transmission in subframe i for serving cell c. In addition, if the data bits size is zero, the data code-rate is zero and $\Delta_{TF,c}(i)$ should be zero.

Assume that $f_c(i)$ is the close-loop PUSCH power control adjustment state in subframe i for serving cell c.

For Type 1 actual power headroom, $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

For Type 1 virtual power headroom, $$PH_{type1,c}(i) = \tilde{P}_{CMAX,c}(i) - \{P_{O\_PUSCH,c}(1)\alpha_c(1) \cdot PL_c + f_c(i)\}$$

Based on the contributions discussed in 3GPP R1-133396, R1-133182, R1-133436, for the UE configured with inter-eNB CA (Carrier Aggregation) with simultaneous uplink transmissions, the UE could alleviate or reduce power issues by reporting PHR of all UL carriers to each Node. Assuming there are PUSCH transmissions both on master and secondary cells in a subframe, the PHR to one eNB would contain the actual power headroom values of both master and secondary cells, according to current 3GPP TS 36.213. However, in view of the non-ideal backhaul between master and secondary eNBs, the macro cell and small cell would be scheduled separately. Thus, it would be impossible for one eNB to get the timely information of allocated PUSCH resources in the other eNB. As a result, it would be difficult to estimate the actual power headroom of the other eNB.

Furthermore, if simultaneous PUCCH (Physical Uplink Control Channel) and PUSCH transmissions are configured for a UE, there may be similar difficulties in determining reflecting the UE power headroom of PUSCH and PUCCH for Type 2 power headroom.

The general concept of the invention is that when a UE reports to a first eNB power headroom of the cells belonging to second eNB, the reported power headroom would be virtual values. In one embodiment, the virtual power headroom value of a cell could be derived assuming a specific PUSCH resource assignment regardless of whether there is PUSCH transmission on the cell in the subframe or not. A zero PUSCH resource assignment means the term $10 \log_{10}(M_{PUSCH,c}(i))$ is either zero or not included in the derivation of virtual power headroom value. Furthermore, the specific PUSCH resource assignment could be zero or a value configured by higher layer.

In addition, the calculation of virtual power headroom values of the cells belonging to the second eNB would not contain dynamically scheduled PUSCH resources if there is PUSCH transmission on the cell. Thus, it would be beneficial for the first eNB, which receive the PHRs, to get the power information of the second eNB, such as pathloss information and/or power requirements.

Furthermore, the virtual power headroom value of a cell could be derived using a zero code-rate, the term $P_{O\_PUSCH,c}(1)$, or the term $\alpha_c(1)$, as specified in 3GPP TS 36.213 V11.4.0. Also, the term $\tilde{P}_{CMAX,c}(i)$ for virtual power headroom calculation could be computed using MPR=0 dB, A-MPR=0 dB, P-MPR=0 dB and $\Delta T_C$=0 dB, as specified in 3GPP TS 36.213 V11.4.0.

Figure 5:
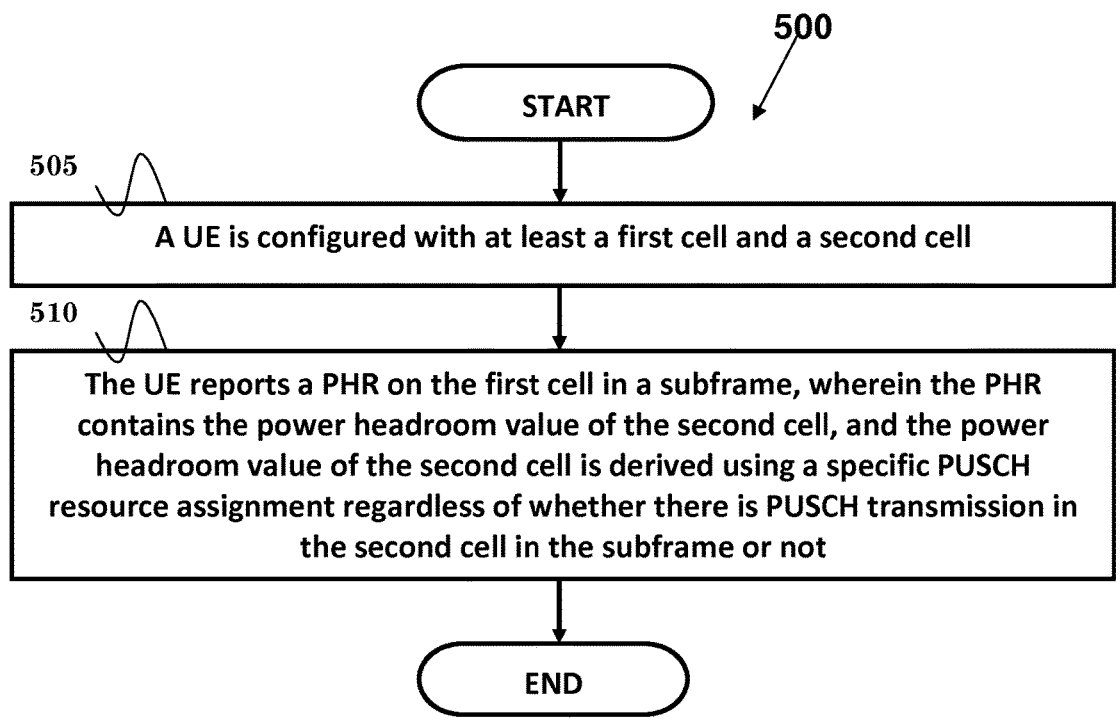
FIG. 5 is a flow chart according to one exemplary embodiment.

FIG. 5 is a flow chart 500 in accordance with one exemplary embodiment. In step 505, a UE is configured with at least a first cell and a second cell. In step 510, the UE reports a PHR (Power Headroom Report) on the first cell in a subframe, wherein the PHR contains the power headroom value of the second cell, and the power headroom value of the second cell is derived using a specific PUSCH resource assignment regardless of whether there is PUSCH transmission in the second cell in the subframe or not.

In one embodiment, the specific PUSCH resources assignment could be zero. Alternatively, the specific PUSCH resources assignment could be configured by higher layer.

In one embodiment, the zero code-rate is used for the derivation of the power headroom value of the second cell. More specifically, the term $\Delta_{TF,c}(i)$ is zero for the derivation of the power headroom value of the second cell. Furthermore, the parameter $\alpha_c(1)$ of pathloss (PL) of the second cell is used for the derivation of the power headroom value of the second cell. In addition, the term $\tilde{P}_{CMAX,c}(i)$, representing the UE maximum transmit power of second cell, is computed using MPR=0 dB, A-MPR=0 dB, P-MPR=0 dB, and $\Delta T_c$=0 dB.

In one embodiment, the power headroom value of the second cell could be Type 1 power headroom or Type 2 power headroom. Furthermore, the power headroom value of the second cell is derived using the following formula or equation:

$$\tilde{P}_{CMAX,c}(i) - \{P_{O\_PUSCH,c}(1) + \alpha_c(1) \cdot PL_c + f_c(i)\}.$$

Alternatively, the power headroom value of the second cell could be derived using the following formula or equation:

$$\tilde{P}_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH}+PL_c+g(i))/10}\right)$$

In one embodiment, the PHR also contains the state information of cell activation and cell deactivation. Furthermore, the second cell could be activated and/or configured with PUCCH. In addition, the first cell and the second cell could be controlled by different eNBs. More specifically, the first cell could be controlled by a macro eNB, a small eNB, a master eNB, or a secondary eNB. Similarly, the second cell could be controlled by a macro eNB, a small eNB, a master eNB, or a secondary eNB. Also, the first cell could be a macro cell, a small cell, a master cell, or a secondary cell. Similarly, the second cell could be a macro cell, a small cell, a master cell, or a secondary cell. In one embodiment, the first cell is a master cell and the second cell is a secondary cell. In one embodiment, the first cell is a secondary cell and the second cell is a master cell respectively.

In one embodiment, the PUSCH transmission could be dynamically scheduled by PDCCH (Physical Downlink Control Channel) with CRC (Cyclic Redundancy Check) scrambled by C-RNTI (Cell Radio Network Temporary Identifier). Alternatively, the PUSCH transmission could be scheduled on a semi-persistence basis by PDCCH with CRC scrambled by SPS (Semi-Persistent Scheduling) C-RNTI. Furthermore, the PUSCH transmission does not contain the semi-persistent scheduled transmission which is scheduled by PDCCH with CRC scrambled by SPS C-RNTI.

In one embodiment, the subframe in the second cell could be a UL (Uplink) subframe, a DL (Downlink) subframe, or a special subframe.

Referring back to FIGS. 3 and 4, the device 300 includes a program code 312 stored in memory 310. Furthermore, in one embodiment, the CPU could execute program code 312 (i) to configure a UE with at least a first cell and a second cell, and (ii) to report a PHR (Power Headroom Report) on the first cell in a subframe, wherein the PHR contains the power headroom value of the second cell, and the power headroom value of the second cell is derived using a specific PUSCH resource assignment regardless of whether there is PUSCH transmission in the second cell in the subframe or not. In addition, the CPU 308 can execute the program code 312 to perform all of the above-described actions and steps or others described herein.

Figure 6:
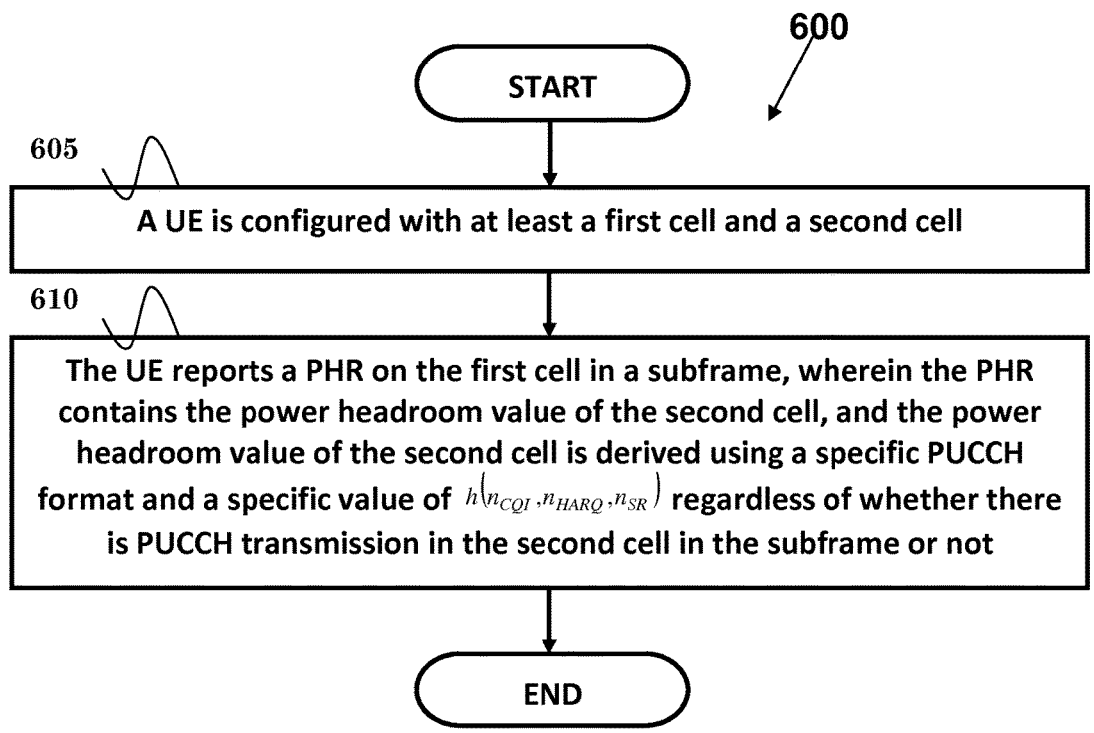
FIG. 6 is a flow chart according to one exemplary embodiment.

FIG. 6 is a flow chart 600 in accordance with one exemplary embodiment. In step 605, a UE is configured with at least a first cell and a second cell. In step 610, the UE reports a PHR (Power Headroom Report) on the first cell in a subframe, wherein the PHR contains the power headroom value of the second cell, and the power headroom value of the second cell is derived using a specific PUCCH (Physical Uplink Control Channel) format and a specific value of $h(n_{CQI}, n_{HARQ}, n_{SR})$ regardless of whether there is PUCCH transmission in the second cell in the subframe or not. The term $h(n_{CQI}, n_{HARQ}, n_{SR})$ could be a PUCCH format dependent value with consideration of the bit number of CQI (Channel Quality Indication), HARQ (Hybrid Automatic Repeat Request), or SR (Scheduling Request).

In one embodiment, the specific PUCCH format could be PUCCH format 1a. Furthermore, the specific PUCCH format could be configured by higher layer, or a PUCCH format configured for HARQ-ACK (Hybrid Automatic Repeat Request Acknowledgment) feedback.

In one embodiment, the power headroom value of the second cell could be Type 2 power headroom. Furthermore, the power headroom value of the second cell is derived using the following formula:

$$\tilde{P}_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH}+PL_c+g(i))/10}\right),$$

wherein $P_{O\_PUCCH}$ is provided by higher layers and g(i) is the close-loop PUCCH power control adjustment state in subframe i.

In one embodiment, the term $\Delta_{F\_PUCCH}(F)$ could be zero for the derivation of the power headroom value of the second cell, wherein $\Delta_{F\_PUCCH}(F)$ is provided by higher layers, and its value corresponds to a PUCCH format (F) relative to PUCCH format 1a. Furthermore, the specific value of $h(n_{CQI}, n_{HARQ}, n_{SR})$ could be zero or could be configured by a higher layer. In addition, the power parameter $\Delta_{T \times D}(F')$ of the second cell is assumed to be zero for the derivation of the power headroom value of the second cell. More specifically, the value of $\Delta_{T \times D}(F')$ is provided by higher layers for each PUCCH format F' if the UE is configured by higher layers to transmit PUCCH on two antenna ports. Also, the term $\tilde{P}_{CMAX,c}(i)$, representing the UE maximum transmit power of the second cell, is computed using MPR=0 dB, A-MPR=0 dB, P-MPR=0 dB, and $\Delta T_C$=0 dB.

In one embodiment, the PHR also contains the state information of cell activation and cell deactivation. Furthermore, the second cell could be activated and/or configured with PUCCH. In addition, the first cell and the second cell could be controlled by different eNBs. More specifically, the first cell could be controlled by a macro eNB, a small eNB, a master eNB, or a secondary eNB. Similarly, the second cell could be controlled by a macro eNB, a small eNB, a master eNB, or a secondary eNB. Also, the first cell could be a macro cell, a small cell, a master cell, or a secondary cell. Similarly, the second cell could be a macro cell, a small cell, a master cell, or a secondary cell. In one embodiment, the first cell is a master cell and the second cell is a secondary cell. In one embodiment, the first cell is a secondary cell and the second cell is a master cell respectively.

In one embodiment, the PUSCH transmission could be dynamically scheduled by PDCCH (Physical Downlink Control Channel) with CRC (Cyclic Redundancy Check) scrambled by C-RNTI (Cell Radio Network Temporary Identifier). Alternatively, the PUSCH transmission could be scheduled on a semi-persistence basis by PDCCH with CRC scrambled by SPS (Semi-Persistent Scheduling) C-RNTI. Furthermore, the PUSCH transmission does not contain the semi-persistent scheduled transmission which is scheduled by PDCCH with CRC scrambled by SPS C-RNTI.

In one embodiment, the subframe in the second cell could be a UL (Uplink) subframe, a DL (Downlink) subframe, or a special subframe.

Referring back to FIGS. 3 and 4, the device 300 includes a program code 312 stored in memory 310. In one embodiment, the CPU 308 could execute program code 312 (i) to configure a UE with at least a first cell and a second cell, and (ii) to report a PHR on the first cell in a subframe, wherein the PHR contains the power headroom value of the second cell, and the power headroom value of the second cell is derived using a specific PUCCH format and a specific value of $h(n_{CQI}, n_{HARQ}, n_{SR})$ regardless of whether there is PUCCH transmission in the second cell in the subframe or not. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for power headroom reporting, the method comprising:
   configuring a UE (User Equipment) with at least a first cell and a second cell; and
   reporting, by the UE, a PHR (Power Headroom Report) on the first cell in a subframe,
   wherein the PHR contains a power headroom value of the second cell, and the derivation of the power headroom value of the second cell does not include bandwidth of PUSCH resource assignment if there is PUSCH transmission in the second cell in the subframe; and
   the derivation of the power headroom value of the second cell does not include bandwidth of PUSCH resource assignment if there is no PUSCH transmission in the second cell in the subframe.

2. The method of claim 1, wherein a term $\Delta_{TF,c}(i)$ is zero for the derivation of the power headroom value of the second cell.

3. The method of claim 1, wherein the first cell and the second cell are controlled by different eNBs (evolved Node B).

4. The method of claim 1, wherein the power headroom value of the second cell is derived using the following formula:

$$\tilde{P}_{CMAX,c}(i) - \{P_{O\_PUSCH,c}(1) + \alpha_c(1) \cdot PL_c + f_c(i)\}.$$

5. The method of claim 4, wherein a term $\tilde{P}_{CMAX,c}(i)$, representing the UE maximum transmit power of the second cell, is computed using MPR=0 dB, A-MPR=0 dB, P-MPR=0 dB, and $\Delta T_C$=0 dB.

6. The method of claim 1, wherein the power headroom value of the second cell is derived using the following formula:

$$\tilde{P}_{CMAX,c}(i) - 10\log_{10}\left( 10^{(P_{O\_PUSCH,c}(1)+\alpha_c(1)\cdot PL_c+f_c(i))/10} + 10^{(P_{0\_PUCCH}+PL_c+g(i))/10} \right).$$

7. The method of claim 1, wherein the power headroom value of the second cell is Type 1 power headroom or Type 2 power headroom.

8. A method for power headroom reporting, the method comprising:
   configuring a UE (User Equipment) with at least a first cell and a second cell; and
   reporting, by the UE, a PHR (Power Headroom Report) on the first cell in a subframe, wherein the PHR contains a power headroom value of the second cell, and the power headroom value of the second cell is derived using a specific PUCCH (Physical Uplink Control Channel) format and a specific value of $h(n_{CQI}, n_{HARQ}, n_{SR})$ if there is no PUCCH transmission in the second cell in the subframe; and
   the power headroom value of the second cell is derived using the specific PUCCH (Physical Uplink Control Channel) format and the specific value of $h(n_{CQI}, n_{HARQ}, n_{SR})$ if there is PUCCH transmission in the second cell in the subframe.

9. The method of claim 8, wherein the specific PUCCH format is PUCCH format 1a, or is configured by higher layer, or is the PUCCH format configured for HARQ-ACK (Hybrid Automatic Repeat Request Acknowledgment) feedback.

10. The method of claim 8, wherein a term $\Delta_{F\_PUCCH}(F)$ is zero for the derivation of the power headroom value of the second cell.

11. The method of claim 8, wherein the specific value of $h(n_{CQI}, n_{HARQ}, n_{SR})$ is zero or is configured by a higher layer.

12. The method of claim 8, wherein the first cell and the second cell are controlled by different eNBs (evolved Node B).

13. The method of claim 8, wherein the power headroom value of the second cell is derived using the following formula:

$$\tilde{P}_{CMAX,c}(i) - 10\log_{10}\left( 10^{(P_{O\_PUSCH,c}(1)+\alpha_c(1)\cdot PL_c+f_c(i))/10} + 10^{(P_{0\_PUCCH}+PL_c+g(i))/10} \right).$$

14. The method of claim 13, wherein a term $\tilde{P}_{CMAX,c}(i)$, representing the UE maximum transmit power of the second cell, is computed using MPR=0 dB, A-MPR=0 dB, P-MPR=0 dB, and $\Delta T_C$=0 dB.

15. The method of claim 8, wherein the power headroom value of the second cell is Type 2 power headroom.

16. A communication device for power headroom reporting, the communication device comprising:
   a control circuit;
   a processor installed in the control circuit;

a memory installed in the control circuit and operatively coupled to the processor;

wherein the processor is configured to execute a program code stored in the memory to:

configure a UE (User Equipment) with at least a first cell and a second cell; and report a PHR (Power Headroom Report) on the first cell in a subframe, wherein the PHR contains a power headroom value of the second cell, and the derivation of the power headroom value of the second cell does not include bandwidth of PUSCH resource assignment if there is PUSCH transmission in the second cell in the subframe; and the derivation of the power headroom value of the second cell does not include bandwidth of PUSCH resource assignment if there is no PUSCH transmission in the second cell in the subframe.

17. The communication device of claim 16, wherein the power headroom value of the second cell is derived using the following formula:

$$\tilde{P}_{CMAX,c}(i) - \{P_{O\_PUSCH,c}(1) + \alpha_c(1) \cdot PL_c + f_c(i)\}.$$

18. The communication device of claim 17, wherein a term $\tilde{P}_{CMAX,c}(i)$, representing the UE maximum transmit power of the second cell, is computed using MPR=0 dB, A-MPR=0 dB, P-MPR=0 dB, and $\Delta T_C$=0 dB.

19. The communication device of claim 16, wherein the power headroom value of the second cell is derived using the following formula:

$$\tilde{P}_{CMAX,c}(i) - 10\log_{10}\left( 10^{(P_{O\_PUSCH,c}(1)+\alpha_c(1) \cdot PL_c + f_c(i))/10} + 10^{(P_{0\_PUCCH}+PL_c+g(i))/10} \right).$$

20. The communication device of claim 16, wherein a term $\Delta_{TF,c}(i)$ is zero for the derivation of the power headroom value of the second cell.

21. The communication device of claim 16, wherein the first cell and the second cell are controlled by different eNBs (evolved Node B).

22. The communication device of claim 16, wherein the power headroom value of the second cell is Type 1 power headroom or Type 2 power headroom.

23. A communication device for power headroom reporting, the communication device comprising:

a control circuit;
a processor installed in the control circuit;
a memory installed in the control circuit and operatively coupled to the processor;

wherein the processor is configured to execute a program code stored in the memory to:

configure a UE (User Equipment) with at least a first cell and a second cell; and report, by the UE, a PHR (Power Headroom Report) on the first cell in a subframe, wherein the PHR contains a power headroom value of the second cell, and the power headroom value of the second cell is derived using a specific PUCCH (Physical Uplink Control Channel) format and a specific value of $h(n_{CQI}, n_{HARQ}, n_{SR})$ if there is no PUCCH transmission in the second cell in the subframe; and the power headroom value of the second cell is derived using the specific PUCCH (Physical Uplink Control Channel) format and the specific value of $h(n_{CQI}, n_{HARQ}, n_{SR})$ if there is PUCCH transmission in the second cell in the subframe.

24. The communication device of claim 23, wherein the specific PUCCH format is PUCCH format 1a, or is configured by higher layer, or is the PUCCH format configured for HARQ-ACK (Hybrid Automatic Repeat Request Acknowledgment) feedback.

25. The communication device of claim 23, wherein a term $\Delta_{F\_PUCCH}(F)$ is zero for the derivation of the power headroom value of the second cell.

26. The communication device of claim 23, wherein the specific value of $h(n_{CQI}, n_{HARQ}, n_{SR})$ is zero or is configured by a higher layer.

27. The communication device of claim 23, wherein the power headroom value of the second cell is derived using the following formula:

$$\tilde{P}_{CMAX,c}(i) - 10\log_{10}\left( 10^{(P_{O\_PUSCH,c}(1)+\alpha_c(1) \cdot PL_c + f_c(i))/10} + 10^{(P_{0\_PUCCH}+PL_c+g(i))/10} \right)$$

28. The communication device of claim 27, wherein a term $\tilde{P}_{CMAX,c}(i)$, representing the UE maximum transmit power of the second cell, is computed using MPR=0 dB, A-MPR=0 dB, P-MPR=0 dB, and $\Delta T_C$=0 dB.

29. The communication device of claim 23, wherein the power headroom value of the second cell is Type 2 power headroom.

30. The communication device of claim 23, wherein the first cell and the second cell are controlled by different eNBs (evolved Node B).

* * * * *